United States Patent [19]

Harting et al.

[11] 4,147,186

[45] Apr. 3, 1979

[54] THERMAL INSULATION ASSEMBLY

[75] Inventors: Louis L. Harting, Crown Point, Ind.; Michael R. Kozlow, Ransomville, N.Y.

[73] Assignee: The Carborundum Company, Niagara Falls, N.Y.

[21] Appl. No.: 841,223

[22] Filed: Oct. 11, 1977

Related U.S. Application Data

[62] Division of Ser. No. 678,793, Apr. 21, 1976, Pat. No. 4,063,573.

[51] Int. Cl.² .............................................. F16L 9/22
[52] U.S. Cl. .................................. 138/155; 138/161; 138/174
[58] Field of Search .............. 138/109, 120, 149, 155, 138/174, 175, 178, 161

[56] References Cited

U.S. PATENT DOCUMENTS 3,941,160   3/1976   Campbell ..................... 138/155 X

FOREIGN PATENT DOCUMENTS 907143   2/1954   Fed. Rep. of Germany ........... 138/161
1369283  10/1974  United Kingdom ..................... 138/155

Primary Examiner—Richard E. Aegerter
Assistant Examiner—Frederick R. Schmidt
Attorney, Agent, or Firm—David E. Dougherty; Raymond W. Green; Michael L. Dunn

[57] ABSTRACT

A thermal insulation assembly for use in conjunction with a similar assembly to encircle an elongated body, said assembly comprising a series of abutting similar U shaped elements which have similar radial and axial orientation, said series and orientation being retained by a plurality of elongated rods passing through said elements.

8 Claims, 4 Drawing Figures

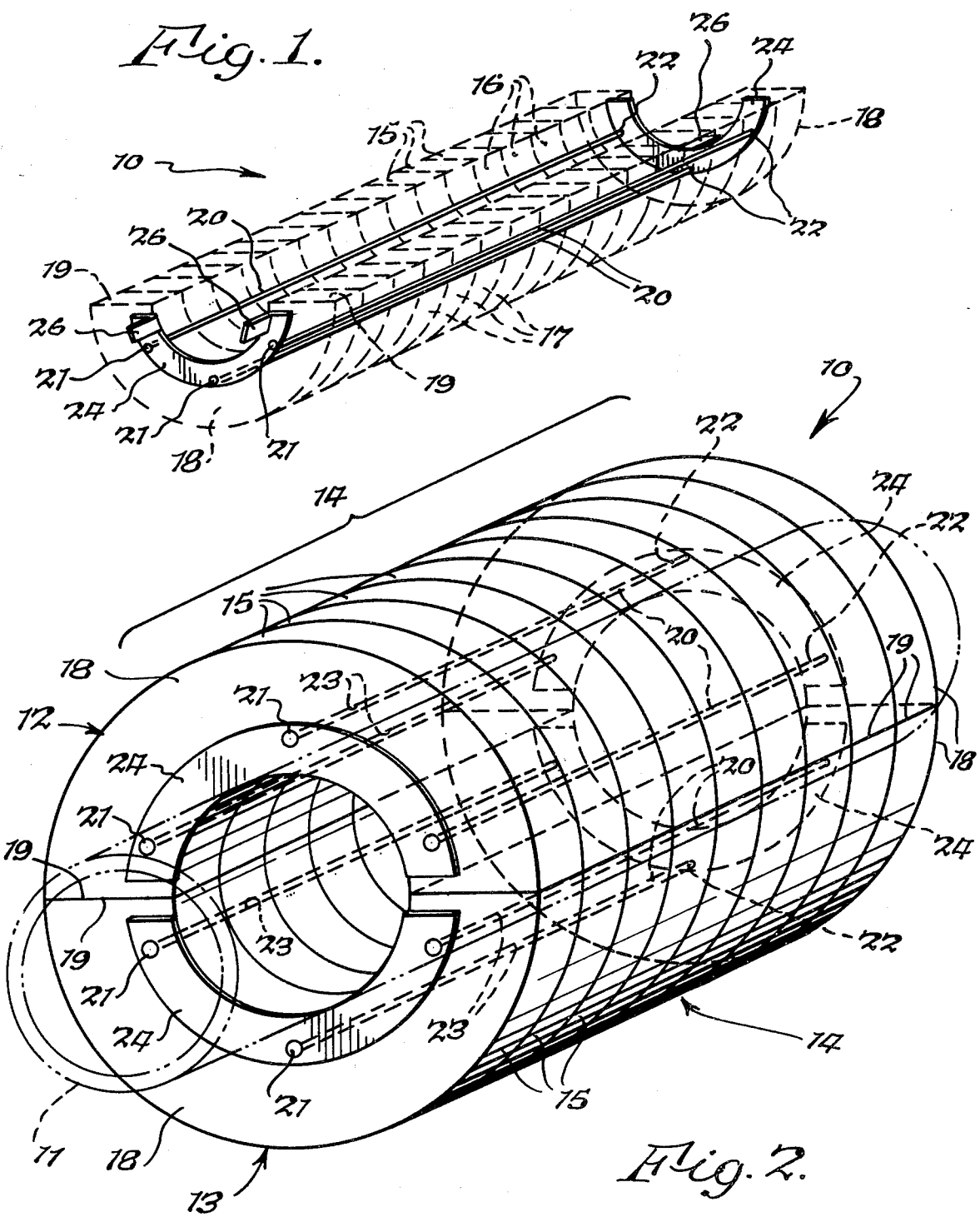

THERMAL INSULATION ASSEMBLY

This is a division of copending application Ser. No. 678,793, filed Apr. 21, 1976, now U.S. Pat. No. 4,063,573.

BACKGROUND OF THE INVENTION

A. Field of the Invention

This invention concerns insulation units for covering elongated bodies to prevent heat transfer between the bodies and the surrounding environment. More particularly, the invention concerns a thermal insulation unit for securely covering an elongated body such as a pipe to protect the elongated body from the high temperatures which may be encountered in furnaces.

B. History of the Prior Art

In the prior art various means were used to protect elongated bodies such as water pipes from elevated temperatures found in the surrounding environment. Many of such means employed the use of refractory materials which were either molded around or otherwise placed around the elongated body. Most such refractory materials were brittle and frequently cracked when any stress was applied to the pipe such as the stress encountered when the pipes were used to support steel slabs moving through a furnace. Attempts were made to reduce the cracking of such refractory materials by applying the refractory materials to the elongated body in separate sections. All of such attempts were not considered satisfactory since gaps or spaces were always left between the sections which permitted heat from the surrounding environment to reach the body. Attempts to hold the refractory materials together and to fill such gaps and spaces with plastic material were then made; however, the means for holding the refractory materials and for filling the spaces involved components which were not sufficiently heat resistant for many applications.

A recent approach to the problem was to use resilient heat resistant materials in the form of split rings which could be placed over the pipe or other elongated body. Numerous such rings were placed over the body so the faces of the rings were in direct contact with and abutted the faces of other rings, thus permitting the entire elongated body to be completely covered. While this recent approach to the problem of protecting the pipe or other elongated body is an improvement over other prior art methods difficulties are still encountered. For example, when the pipe or other elongated body vibrates, as is the case when the pipe supports a steel slab moving through a furnace, rings become misaligned and spaces between the rings develop, thus permitting heat from the furnace to reach the body.

BRIEF DESCRIPTION OF THE INVENTION

The present invention is a thermal insulation unit for securely covering an elongated body, which unit overcomes deficiencies encountered in the prior art. For example, the units can be easily and rapidly applied to the elongated body and provide excellent protection for the body. The thermal insulation unit in accordance with the invention comprises first and second assemblies. Each such assembly is designed for use in conjunction with a similar assembly to encircle an elongated body. Each such assembly comprises a series of abutting similar U shaped insulation elements which have similar radial and axial orientation. The series and orientation are retained by a plurality of elongated rods passing through the elements.

Each of the elements is made of a resilient heat resistant material and desirably has an interior surface, and exterior surface, two side surfaces and two end surfaces.

The elements in the series are in aligned arrangement, the side surface of each element securely contacting a side surface of each abutting element. Each of the elements in the assembly have a radial orientation similar to that of each abutting element. The arrangement is held by a plurality of elongated rods having first and second ends. The rods pass through axially oriented holes in the elements and the rods are joined and secured at their first ends by a first plate. The first plate is smaller than the side surface nearest the plate and is arranged so that all portions of the plate are distally removed from all exterior surfaces. The rods are similarly joined at their second ends by a second plate which is smaller than the side surface nearest the second plate. The first and second assemblies of the unit abut and are joined at the end surfaces of the elements of the assemblies to completely encircle the elongated body. The unit has a resiliency which overcomes the disadvantages of brittle refractory materials used in the prior art. In addition, misalignment of the elements and loose elements are eliminated by means of the securing and compacting effect of the plates and rods. Furthermore, there are no exposed components which are heat sensitive. The only time a separate ring is used is between adjoining thermal insulation units to protect the end plates. The assemblies may be joined together at the end surfaces by a connecting means between the plates of the first and second assemblies such as a pin or bolt passing through aligned holes in the plates of the first and second assemblies.

BRIEF DESCRIPTION OF THE DRAWINGS

FIG. 1 is a perspective view showing the construction of the insulation assembly;

FIG. 2 is a perspective view showing an assembled thermal insulation unit in accordance with the invention in relation to the insulated elongated body;

DETAILED DESCRIPTION OF THE INVENTION

Figure 3:
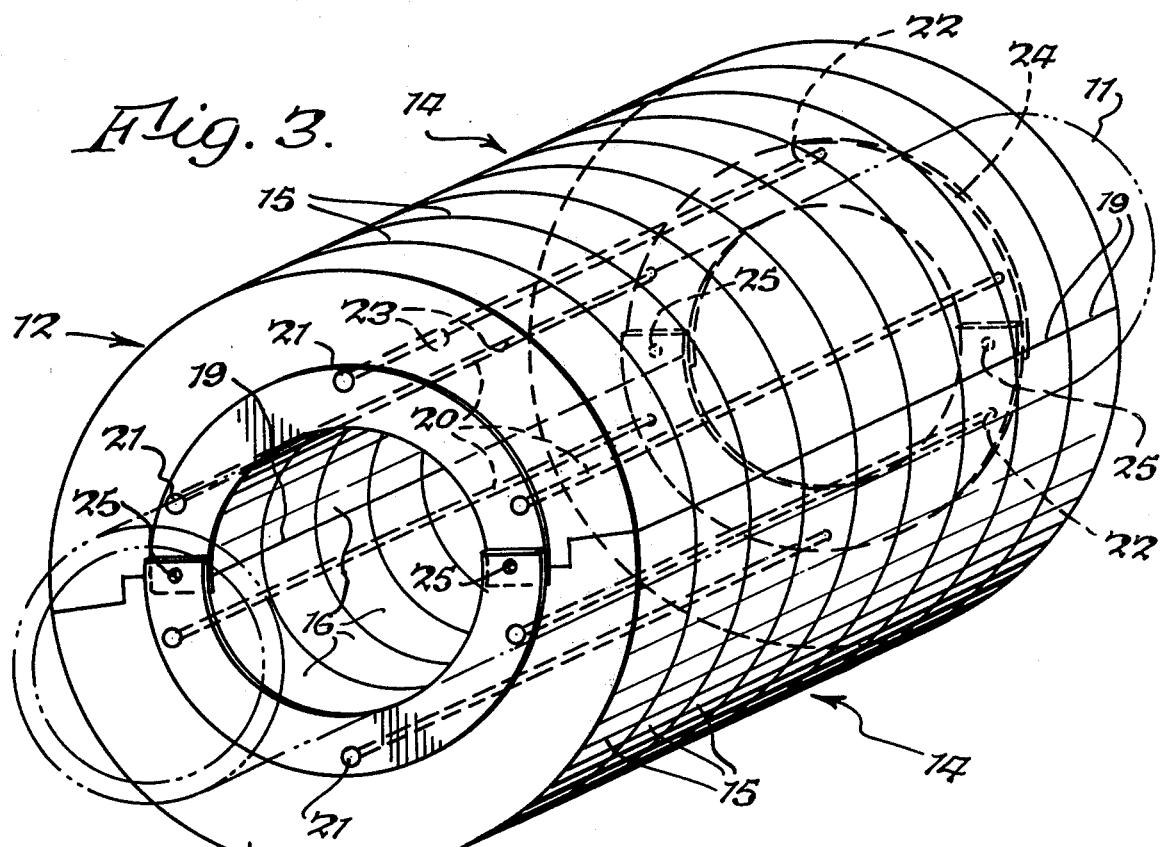
FIG. 3 is a perspective view of an assembled thermal insulation unit in accordance with the invention showing an alternative assembly means.

The elongated body which the thermal insulation unit is designed to cover may be essentially any elongated body when heat transfer between the elongated body and its environment is not desirable. The elongated body may be solid or fluid and may be in the form of energy such as a flame or laser beam. Generally, the elongated body is a solid shape which may have essentially any cross section. Suitable cross sections may, for example, be any polygon such as a triangle, a hexagon or a parallelogram including squares, rectangles and diamonds. Other suitable cross sections would include shapes defined by curved lines including circles and other elipses.

The U shaped insulation element may be made of any suitable resilient heat resistant material and is preferably aluminum silicate when the unit is to be used at high temperatures, i.e. up to about 2,600 degrees F. At lower temperatures other materials, particularly spun materials, may be used such as spun silica, aluminum or glass.

"U-shaped" as used throughout this specification and claims means a shape which is or approximates the shape of the letter U in the alphabet. The U shape may have curved or angular surfaces and the upper ends of the U may be in the same or in different planes. The interior surface of the U shaped element is the indented surface in the U seen as one would look downwardly toward the top of the U. The exterior of the U shaped insulation element is the surface which is seen as one looks upwardly toward the bottom of the U. The side surfaces of the U shaped insulation element are the surfaces seen as one looks at the side of the U shaped element. The side surfaces are the surfaces which have the characteristic U shaped appearance. The end surfaces of the U shaped insulation element are the surfaces on the ends of the legs of the U and are seen as one looks downwardly toward the top of the element. The top of the U shaped element as used herein means the upper portion of the U shape when the U shape is in the normal or characteristic position when the U shape is used as a letter in the alphabet. The bottom of the U shaped insulation element is the portion of the U when the U shape is in the normal or characteristic position when the U is used as a letter in the alphabet.

To form the first and second assemblies which are joined together to obtain the thermal insulation unit, a series of abutting similar U shaped insulation elements are aligned with the side surfaces of each one of the elements securely contacting a side surface of abutting elements, i.e. touching elements. Each of said elements have a radial orientation similar to that of abutting elements. Similar radial orientation as used herein means that the lowermost portion of the U shapes are oriented in the same direction.

"Elongated rod" as used herein means any elongated structure regardless of the shape of its cross section. The rod may be manufactured of a metallic, ceramic or plastic material. The rods pass through axially oriented holes in the elements to hold the elements together in the proper respective radial orientation as previously discussed. "Axially oriented holes" means holes through the elements in essentially the same direction as the axis of the elongated body to be protected by the thermal insulation unit. The radial dimension of the rods passing through the axially oriented holes is large enough to provide sufficient structural strength to maintain the elements in their proper orientation and to hold the surfaces of the elements tightly against abutting elements in the assembly. The radial dimension of the rods is, however, sufficiently small so that the rod is completely protected from environmental heat by the elements through which the rods pass.

The rods are joined and secured at their ends to plates which are smaller than the side surfaces of the elements so that the elements are tightly held together by the rods and attached plates. The plates are smaller than the side surface of the elements and all portions of the plate are distally removed from the exterior surface of the elements to protect the plates from environmental heat. The plates may be manufactured from metallic, ceramic or plastic materials of suitable strength. The plates may be placed against the elongated body when the unit is assembled upon the body. When the plate is placed against the elongated body, the plate and attached rods may be cooled by the body particularly when the body is a pipe carrying cooling water and when the plates and rods are manufactured from a metallic material. The first and second assemblies are placed upon the elongated bodies so that the elongated body is completely encircled by the interior surfaces of the first and second assemblies.

The first and second assemblies are joined together to form the thermal insulation unit. The assemblies may be joined together by any suitable means provided such means is protected from environmental heat. Preferred means for joining the assemblies include using an adhesive to directly attach the assemblies to the elongated body and a fastening means for joining the plates of the first assembly to the plates of the second assembly. Such fastening means generally comprises holes passing through the plates of each of the assemblies and bolts, bars or screws which pass through the holes in the plates and secure the plates to each other.

The first and second assemblies are joined together in respective positions which permit the end surfaces of the elements of said assemblies to abut in a position upon the elongated body which permits the interior surfaces of the elements of the assemblies to completely encircle the elongated body.

For ease of construction, the end surfaces of each of the elements are planar. Such planar surfaces permit such surfaces to contact each other over essentially the entire end surface and complicated shaping is not required.

In addition, when the end surfaces in an assembly are in the same or parallel planes, uniform shape and orientation of elements is possible.

Other more complicated end surfaces are possible which permit a more stable and stronger union of end surfaces. For example, the end surfaces may be in intersecting planes which gives a wedge effect when the end surfaces of the assemblies are abutted to form the insulation unit or portions of each of the end surfaces may be in separate planes thus permitting the end surfaces to be interfitted.

Figure 4:
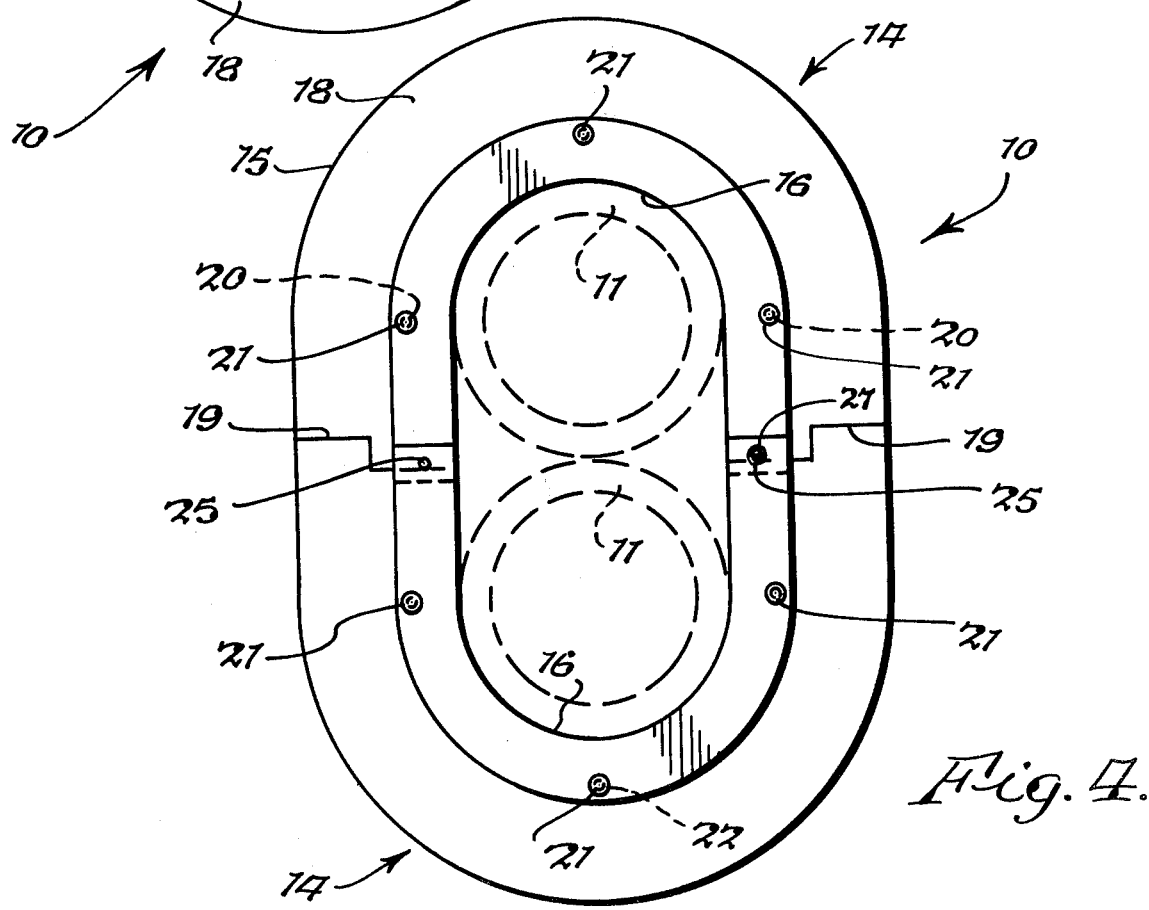
FIG. 4 is a front end view of an assembled thermal insulation unit in accordance with the invention showing an alternative interior configuration for insulating more than one elongated body.

As seen in the drawings and particularly in FIGS. 2 and 3 of the drawings, thermal insulation unit 10 for covering an elongated body 11 comprises first and second assemblies 12 and 13. Each of said assemblies 12 and 13 comprise a series 14 of abutting similar U shaped insulation elements 15 which are made of the resilient heat resistant material which is preferably a network of aluminum silicate fibre. As best seen in FIGS. 1 and 3, each of the U shaped insulation elements 15 have an interior surface 16, an exterior surface 17, two side surfaces 18 and two end surfaces 19. The elements in series 14 are in an aligned arrangement with the side surface 18 of each element 15 securely contacting a side surface of abutting elements 15. Each element 15 has a radial orientation similar to that of abutting elements 15. The arrangement is held by a plurality of elongated rods 20 having first and second ends 21 and 22. The rods pass through axially aligned and oriented holes 23 through elements 15. Rods 20 are joined and secured at their first ends 21 by a first plate 24 which is smaller than the side surface 18 nearest plate 24. Plate 24 is arranged so that all portions of plate 24 are distally removed from all exterior surfaces 17. Rods 20 are similarly joined at second ends 22 by a second plate 24 which is smaller than the side surface 18 nearest second plate 24. All portions of second plate 24 are distally removed from all exterior surfaces 17. First and second assemblies 12 and 13 are joined together to form thermal insulation unit 10. Assemblies 12 and 13 abut at end surfaces 19 of elements 15 in a position with respect to elongated body 11 which permits interior surface 16 of the elements 15 of assemblies 12 and 13 to completely encircle elongated body 11. As seen in FIGS. 3 and 4, first and second assemblies 12 and 13 may be secured together by means of holes 25 in plates 24 through which a securing screw 27 passes.

When one or more units 10 are used in conjunction with each other, the units may be provided with tabs 26 so that the units are maintained in aligned relationship with each other. Preferably, when a plurality of units 10 are used to cover an elongated body, one free element 15 unattached to an assembly is inserted between the units to protect plates 24 from environmental heat. As seen in FIG. 4, the thermal insulation unit can encircle more than one elongated body at a time. As seen in FIGS. 1 and 2, the end surfaces 19 may be planar or as seen in FIGS. 3 and 4, portions of each end surface 19 may be in separate planes to permit end surfaces 19 to be interfitted.

What is claimed is:

1. A thermal insulation assembly for use in conjunction with a similar assembly to encircle an elongated body, said assembly comprising a series of abutting similar U shaped elements which have similar radial and axial orientation, said series and orientation being retained by a plurality of elongated rods having first and second ends passing through said elements, said rods being joined at their first ends by a first plate and being joined at their second ends by a second plate.

2. A thermal insulation assembly for use in conjunction with a similar assembly to form a thermal insulation unit for encircling an elongated body, said assembly comprising a series of abutting similar U shaped elements each of said elements having an interior surface, an exterior surface, two side surfaces and two end surfaces, the elements in said series being in an aligned arrangement with a side surface of each element securely contacting a side surface of each abutting element and each of said elements having a radial orientation similar to that of each abutting element, said arrangement being held by a plurality of elongated rods having first and second ends, said rods passing through axially oriented holes in said elements, said rods being joined and secured at their first ends by a first plate, said plate being smaller than the side surface nearest said plate and being arranged so that all portions of said plate are distally removed from all exterior surfaces, said rods being similarly joined at their second ends by a second plate which is smaller than the side surface nearest said second plate, all portions of said second plate being distally removed from all exterior surfaces.

3. The assembly claimed in claim 2 wherein the end surfaces of each of said elements are planar.

4. The assembly claimed in claim 3 wherein both of the end surfaces of each of the elements are in the same plane.

5. The assembly as claimed in claim 3 wherein the end surfaces of each of the elements are in parallel planes.

6. The assembly as claimed in claim 3 wherein the end surfaces of each of said elements are in intersecting planes.

7. The thermal insulation assembly as claimed in claim 2 wherein portions of each of the end surfaces of each of the elements are in separate planes.

8. The assembly as claimed in claim 2 wherein at least one of the plates is provided with at least one tab, substantially perpendicular to the plate and extending from the assembly substantially parallel to the axis of the assembly, for maintaining the assembly in aligned relationship with an adjacent assembly.

* * * * *